(12) United States Patent
Sato et al.

(10) Patent No.: US 7,343,690 B2
(45) Date of Patent: Mar. 18, 2008

(54) SHAPE-MEASURING DEVICE

(75) Inventors: Yoshihiro Sato, Nissin (JP); Tadayoshi Yasui, Nagoya (JP); Akihiro Mizutani, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/579,495

(22) PCT Filed: Nov. 16, 2004

(86) PCT No.: PCT/JP2004/016994

§ 371 (c)(1),
(2), (4) Date: May 16, 2006

(87) PCT Pub. No.: WO2005/052503

PCT Pub. Date: Jun. 9, 2005

(65) Prior Publication Data

US 2007/0144024 A1      Jun. 28, 2007

(30) Foreign Application Priority Data

Nov. 28, 2003   (JP)   .............................. 2003-400171

(51) Int. Cl.
*G01B 5/207*   (2006.01)
(52) U.S. Cl. .......................................... 33/552; 33/533
(58) Field of Classification Search ................ 33/533, 33/551, 552, 553, 554, 735, 773
See application file for complete search history.

(56) References Cited

U.S. PATENT DOCUMENTS

| 4,577,494 | A | * | 3/1986 | Jaeggi .......................... 33/552 |
| 4,916,824 | A | * | 4/1990 | Shimazutsu et al. ........... 33/551 |
| 5,535,143 | A | * | 7/1996 | Face ............................. 33/554 |
| 6,151,791 | A | * | 11/2000 | Shimazutsu et al. ........... 33/552 |
| 6,954,991 | B2 | * | 10/2005 | Akatsuka et al. .............. 33/553 |
| 2005/0198849 | A1 | * | 9/2005 | Goeggelmann et al. ........ 33/552 |

FOREIGN PATENT DOCUMENTS

| JP | A 49-008271 | 1/1974 |
| JP | A 55-037918 | 3/1980 |
| JP | U 57-037406 | 2/1982 |
| JP | U 60-085308 | 6/1985 |
| JP | A 11-160006 | 6/1999 |

* cited by examiner

*Primary Examiner*—G. Bradley Bennett
(74) *Attorney, Agent, or Firm*—Oliff & Berridge, PLC (57) ABSTRACT

A shape-measuring device 1 measures the shape of a object to be measured 1 in which segments are arranged and bonded in rows while relatively moving the object 1 in one direction. The shape-measuring device includes rollers 31 provided corresponding to the rows of segments and displaced to follow unevenness of an end face 1a of the object while being rotated on the end face 1a due to the relative movement, detection means 35 provided corresponding to each roller 31 and detecting the amount of displacement of each roller 31, and calculation means 37 for calculating shape data of the object 1 based on the amount of displacement of the roller 31 detected by the detection means 35. The shape-measuring device 1 can accurately and promptly measure the shape of the object such as a DPF in which segments are bonded in rows.

3 Claims, 8 Drawing Sheets

SHAPE-MEASURING DEVICE

TECHNICAL FIELD

The present invention relates to a shape-measuring device which measures the shape of a object to be measured such as a diesel particulate filter in which segments are bonded in rows.

BACKGROUND ART

In recent years, a diesel engine has been widely equipped with a diesel particulate filter (DPF) in an exhaust system (e.g. muffler) and particulates contained in exhaust gas are removed by the DPF. The DPF is formed into a shape such as cylinder or elliptical cylinder corresponding to a muffler shape for a diesel engine by bonding sintered segments formed of silicon carbide or the like using a bonding material. The segments are formed to have a rectangular or square tubular shape, and are arranged and bonded in rows. The bonded body is ground into a cylindrical shape or the like to have a shape corresponding to the muffler shape.

The DPF is incorporated into a muffler using a press tool. It is preferable that the DPF be pushed into the muffler without being inclined, from the viewpoint of exhaust gas leakage prevention, mounting stability, and the like. This requires that the degree of flatness and the degree of parallelism of the end face be within a specific allowable range. However, since the segment is formed of a sintered product, the length of the segment tends to vary. Moreover, since the bonding material may protrude from the end face, the end face of the DPF becomes uneven, whereby a product having a shape outside the allowable range may be produced. Therefore, it is necessary to measure the shape of the DPF in order to select only a DPF having a shape within the allowable range. In related art, the shape of the DPF is measured by the following method.

(1) A number of probes (e.g. dial gauge or linear gauge) are disposed corresponding to respective segments and caused to contact the end faces of the segments at the same time to measure the heights of the segments.

(2) One probe (e.g. dial gauge or linear gauge) is provided, and the worker measures the data of the end face while rotating the DPF.

(3) The DPF is provided on a turntable, and the edge of the DPF is detected using an image sensor while rotating the DPF to measure the height of the perimeter of the DPF (see patent document 1).

Patent document 1: JP-A-55-37918

DISCLOSURE OF THE INVENTION

However, the related-art measuring methods respectively have the following problems.

Specifically, the method (1) increases the amount of data obtained, whereby the data processing speed is decreased. Moreover, since the method (1) measures only the segments, protrusion of the bonding material cannot be measured, whereby accurate data cannot be obtained. Furthermore, since it is necessary to hold the DPF during the measurement, continuous measurement cannot be performed while moving the DPFs, whereby it is difficult to promptly process a large number of DPFs.

The method (2) increases the period of time required to measure the DPF. Moreover, the method (2) does not allow automatic measurement as well as continuous measurement while moving the DPFs.

The method (3), which obtains only the height information of the outer circumferential portion of the DPF, does not allow measurement of the degree of flatness and the degree of parallelism. Moreover, since it is impossible to measure protrusion of the bonding material, accurate data cannot be obtained. In addition, a DPF having a non-round shape such as an oval shape cannot be measured.

The present invention was achieved in view of the above-described problems. An object of the present invention is to provide a shape-measuring device which can reliably obtain the state of each segment and the bonding material for a measurement target such as a DPF in which segments are bonded, can accurately measure the degree of flatness and the degree of parallelism, and can promptly process a large number of measurement targets. As a result of extensive studies, it was found that the above object can be achieved by the following means.

According to the present invention, there is provided a shape-measuring device which measures a shape of a object to be measured in which segments are arranged and bonded in rows while relatively moving the object in one direction, the shape-measuring device comprising: a plurality of rollers provided corresponding to the rows of segments and displaced to follow unevenness of an end face of the object while being rotated on the end face due to the relative movement; detection means provided corresponding to each of the rollers and detecting an amount of displacement of each of the rollers; and calculation means for calculating shape data of the object based on the amount of displacement of the roller detected by the detection means.

In the shape-measuring device according to the present invention, the rollers provided corresponding to the rows of segments are displaced (e.g. vertically) to follow the unevenness of the end face of the object while being rotated on the end face, the detection means detects the amount of displacement, and the calculation means calculates the shape data based on the detected values. In the present invention, since the rollers are provided corresponding to the rows of segments, all the segment rows can be measured, and the bonding material through which the segments are bonded can also be measured. Therefore, the degree of flatness and the degree of parallelism of the object can be reliably measured, whereby accurate measurement can be achieved. Moreover, since the measurement can be performed while relatively moving the object and the roller in one direction, a continuous measurement can be performed, whereby it is possible to process a large number of objects.

In the shape-measuring device according to the present invention, the detection means is preferably a contact probe which contacts a roller frame on which the roller is rotatably secured and detects an amount of displacement of the roller frame displaced due to the displacement of the roller. According to this preferable feature, since the contact probe which contacts the roller frame is used as the detection means, the force in the workpiece traveling direction is not applied to the probe, but only the vertical displacement is applied. Therefore, the amount of displacement can be accurately detected using a simple structure, and the lifetime of the probe is increased.

In the shape-measuring device according to the present invention, the roller is preferably a cam follower. According to this preferable feature, since the cam follower is used as the roller, the amount of wear of the contact can be reduced by rotation of the roller, and the displacement following the unevenness of the end face of the object can be accurately measured.

Since the shape-measuring device according to the present invention can measure all the segment rows and measure the bonding material through which the segments are bonded, the degree of flatness and the degree of parallelism of the object can be reliably and promptly measured. Moreover, since the shape-measuring device according to the present invention measures the shape of the object while relatively moving the object and the roller, a continuous measurement can be achieved, whereby it is possible to process a large number of objects.

According to the preferable feature of the shape-measuring device according to the present invention, since the force in the workpiece traveling direction is not applied to the probe, but only the vertical displacement is applied, the amount of displacement can be accurately detected using a simple structure while achieving the above-described effects.

According to the preferable feature of the shape-measuring device according to the present invention, since the amount of wear of the contact can be reduced and the displacement following the unevenness of the end face of the object can be reliably achieved, the shape of the object can be accurately measured while achieving the above-described effects.

EXPLANATION OF SYMBOLS

1: DPF, 1*a*: end face of DPF, 11: shape-measuring device, 12: movement section, 13: measurement section, 18: placement stage, 22: measurement stage, 31: roller, 33: roller frame, 35: contact probe, 37: calculation means

BEST MODE FOR CARRYING OUT THE INVENTION

Embodiments of the present invention are described below with reference to the drawings. Note that the present invention is not limited to the following embodiments. Various alterations, modifications, and improvements may be made in the embodiments within the scope of the invention based on knowledge of a person skilled in the art. Although the drawings represent preferred embodiments of the present invention, the present invention is not limited to the modes illustrated in the drawings or the information given in the drawings. Although the present invention may be practiced or verified by applying means similar to or equivalent to means described herein, preferred means is the means described herein.

Figure 6:
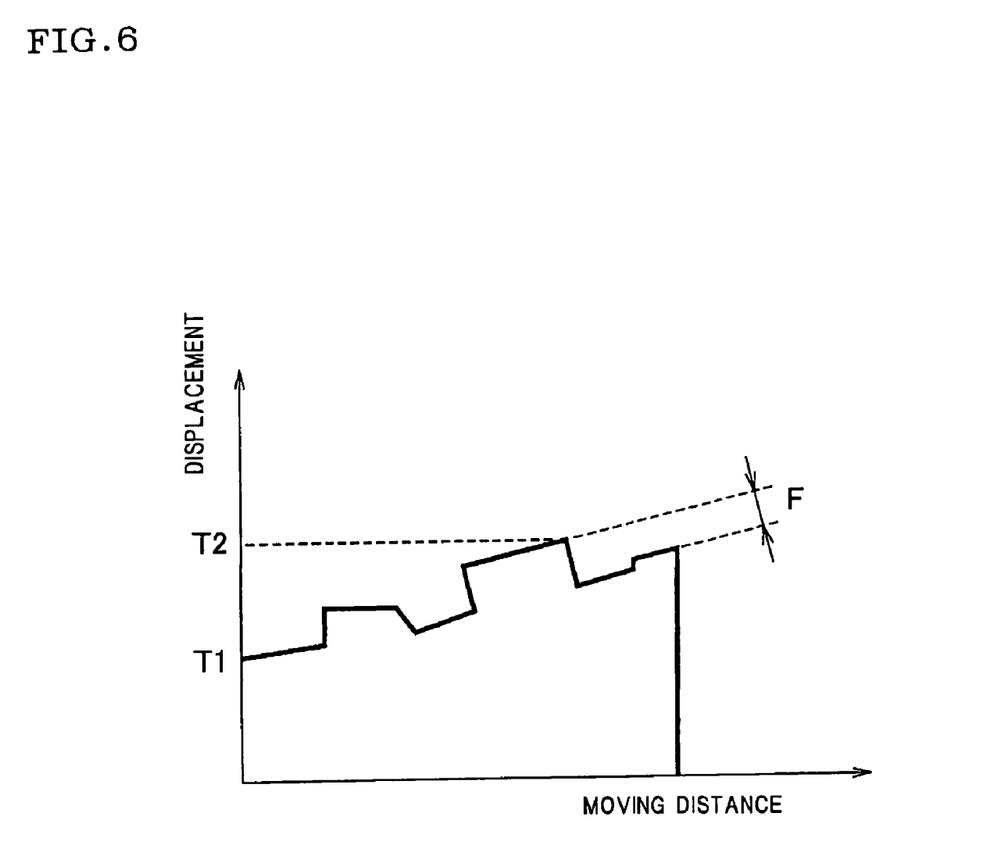
FIG. 6 is a characteristic diagram showing an example of measured data.
Figure 7:
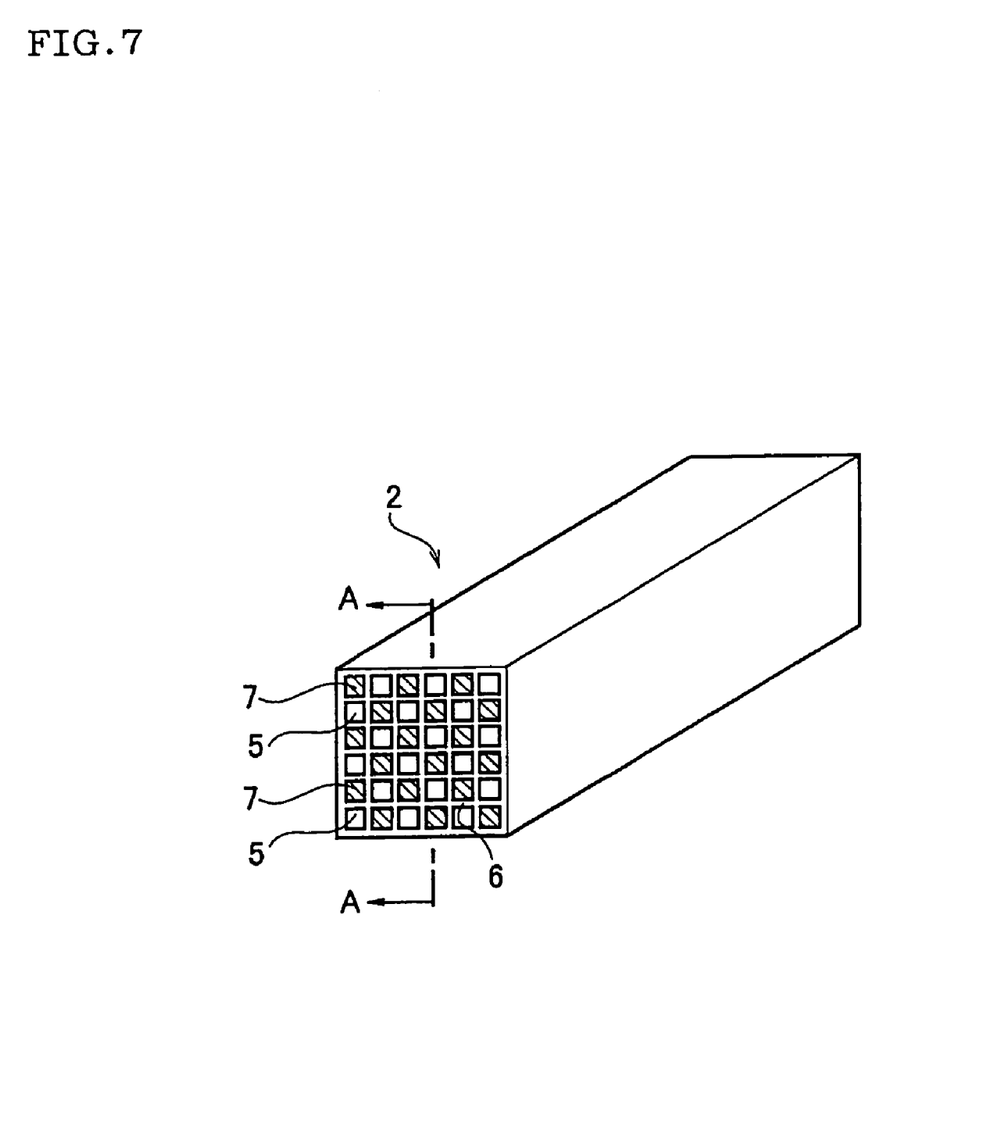
FIG. 7 is a perspective view of an example of a segment.
Figure 8:
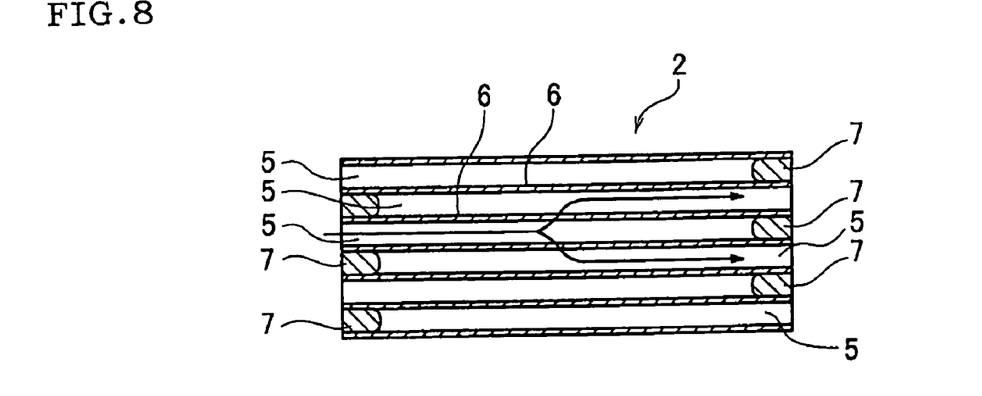
FIG. 8 is a cross-sectional view along the line A-A shown in FIG. 7.
Figure 9:
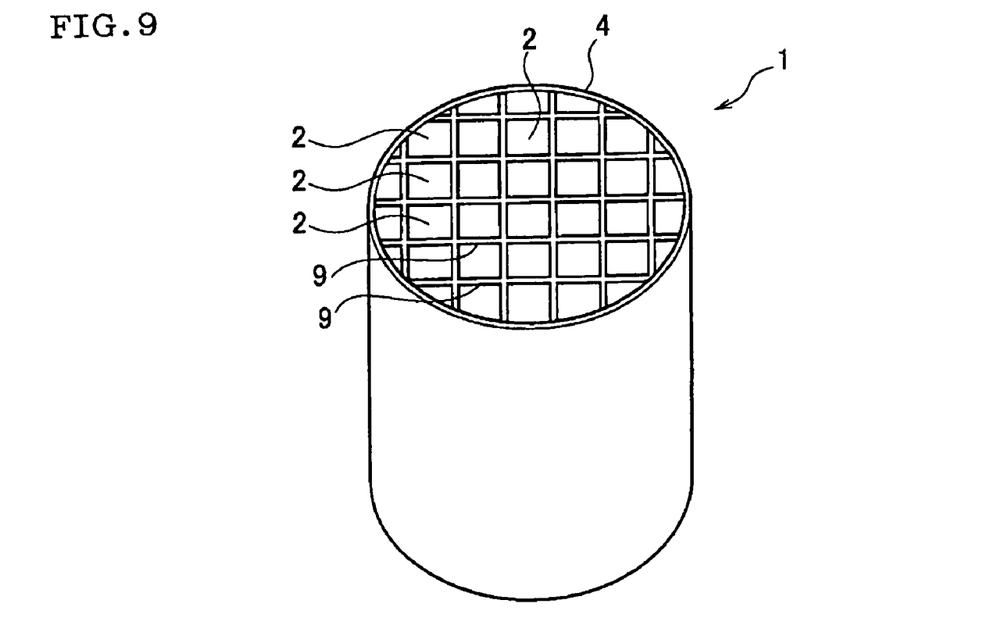
FIG. 9 is a perspective view of a DPF.

FIGS. 1 to 5 are views showing one embodiment of a shape-measuring device according to the present invention. FIG. 6 is a view showing an example of a graph of measurement results. FIGS. 7 and 8 are views showing an example of a segment. FIG. 9 is a view showing an example of a DPF as a object.

The shape-measuring device according to the present invention is applied to a DPF 1 shown in FIG. 9 or a object of another shape. The DPF 1 is described below with reference to FIGS. 7 to 9. The DPF 1 is formed by bonding segments 2 shown in FIGS. 7 and 8 using a bonding material 9.

As shown in FIGS. 7 and 8, the segment 2 includes a number of through holes 5 partitioned by porous partition walls 6. The through hole 5 passes through the segment 2 in the axial direction. The adjacent through holes 5 are alternately plugged on either end using a filler material 7. Specifically, one through hole 5 is open on the left end and is plugged on the right end using the filler material 7, and the through hole 5 adjacent thereto is plugged on the left end using the filler material 7 and is open on the right end.

This structure allows exhaust gas which has flowed into the through hole which is open on the left end to pass through the porous partition walls 6 and exit from other through holes 5, as indicated by the arrow shown in FIG. 8. Particulates in the exhaust gas are trapped by the partition walls 6 when the exhaust gas passes through the partition walls 6, whereby the exhaust gas can be purified. Although the segment 2 has a square cross section in FIG. 7, the segment 2 may have an arbitrary cross-sectional shape (e.g. triangular cross section or hexagonal cross section). The cross-sectional shape of the through hole 5 may be a triangle, hexagon, circle, oval, or other miscellaneous shapes.

The DPF 1 is produced by arranging the segments 2 in rows and bonding the arranged segments 2 using the bonding material 9. After bonding the segments 2, the bonded matter is ground to have an appropriate cross section such as a circular cross section, oval cross section, or triangular cross section, and the outer circumferential surface of the ground product is coated with a coating material 4.

As the material for the segment 2, a material selected from the group consisting of cordierite, mullite, alumina, spinel, silicon carbide, a silicon carbide-cordierite composite material, a silicon-silicon carbide composite material, silicon nitride, lithium aluminum silicate, aluminum titanate, an Fe—Cr—Al metal, and a combination of these materials is used from the viewpoint of strength and heat resistance. In particular, silicon carbide or a silicon-silicon carbide composite material is suitably used.

The segment 2 is produced as follows. A binder such as methylcellulose, hydroxypropoxylcellulose, hydroxyethylcellulose, carboxymethylcellulose, or polyvinyl alcohol, a surfactant, water, and the like are added to a material selected from the above-mentioned materials to prepare plastic clay. The clay is then extruded to obtain a product having a honeycomb shape including a number of through holes 5 partitioned by the partition walls 6 and passing through the product in the axial direction. The product is then dried using microwaves, hot blast, or the like, and fired to obtain the segment 2.

As the material for the bonding material 9 used for bonding the segments 2, a material suitable for the segment 2 is used. For example, a material prepared by arbitrarily adding a metal such as a metal fiber, a pore-forming material, various types of ceramic particles, and the like to a mixture of inorganic particles or fibers such as silicon carbide, silicon nitride, cordierite, alumina, or mullite and colloidal sol such as colloidal silica or colloidal alumina may be used.

Figure 1:
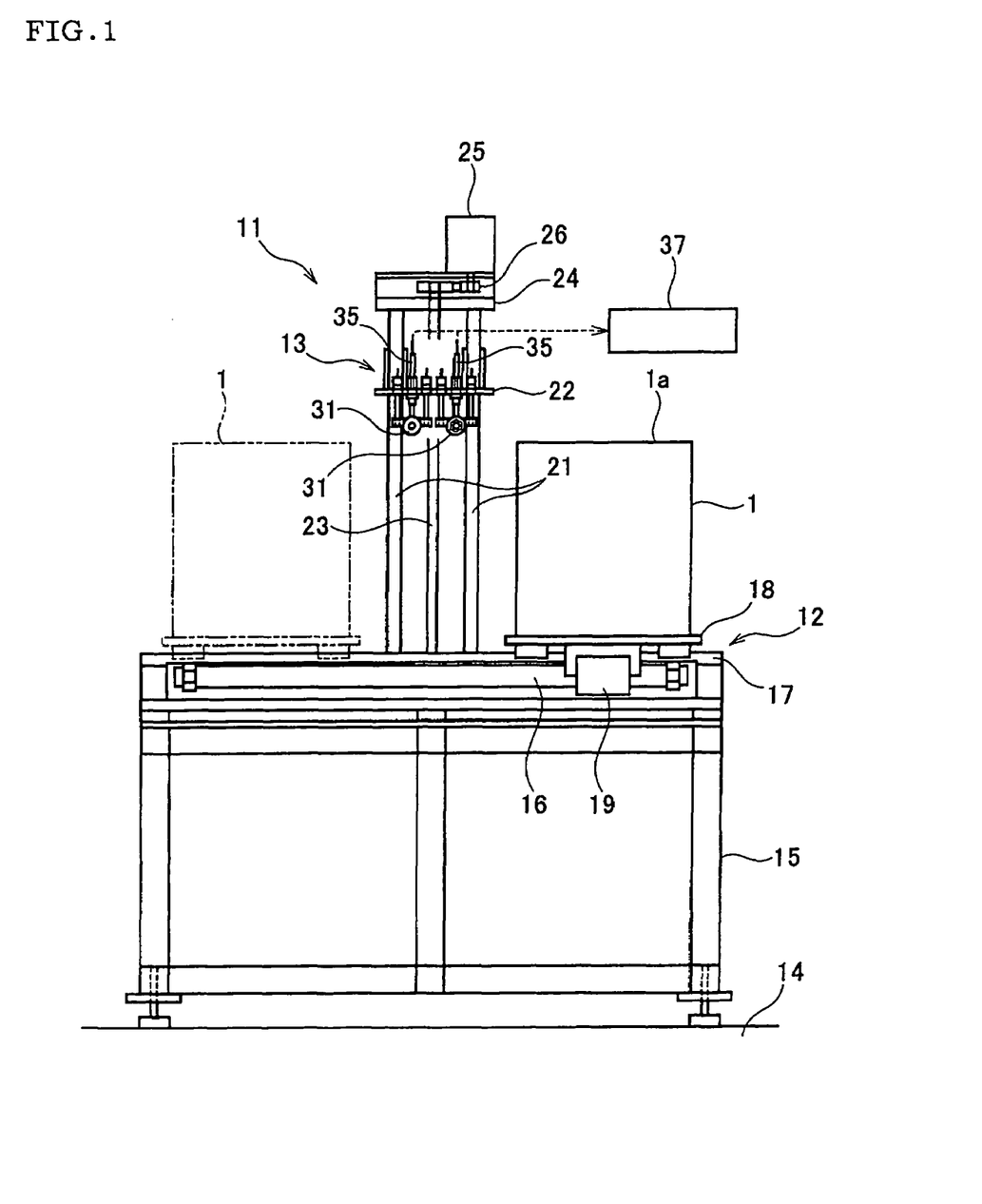
FIG. 1 is an overall front view showing one embodiment of a shape-measuring device according to the present invention.

The shape-measuring device according to this embodiment is described below. As shown in FIG. 1, a shape-measuring device 11 includes a movement section 12 for linearly moving the DPF 1 as a object, and a measurement section 13 for measuring the end face of the DPF 1.

The movement section 12 includes a frame 15 placed on a floor 14. A feed rod 16 formed by a ball screw horizontally extending in one direction (right and left direction) and the like, and a guide rod 17 extending in the same direction as the feed rod 16 are provided at the top of the frame 15.

A placement stage 18 on which the DPF 1 is placed slidably engages the guide rod 17. A movement motor 19 including a deceleration mechanism is provided to the bottom of the placement stage 18. The feed rod 16 passes through the movement motor 19 in an engagement state. In such a structure, the placement stage 18 linearly moves from the right toward the left along the guide rod 17 by driving the movement motor 19, and an end face 1a of the DPF 1 is measured by the measurement section 13 during movement.

The measurement section 13 includes two posts 21 vertically provided approximately at the center of the frame 15, and a measurement stage 22 provided to vertically move along the posts 21. A vertical feed rod 23 formed by a ball screw and the like is vertically provided between the posts 21. A motor stage 24 is secured at the top of the posts 21, and a vertical movement motor 25 is secured on the motor stage 24. The vertical movement motor 25 engages the vertical feed rod 23 through a gear wheel mechanism 26, and rotates the vertical feed rod 23 when being driven. The rotation allows the measurement stage 22 to vertically move. A plurality of rollers 31, which measure the end face 1a of the DPF 1, are secured on the measurement stage 22.

The rollers 31 are provided corresponding to the rows of arranged segments 2 of the DPF 1. Specifically, when the DPF 1 placed on the placement stage 18 has a plurality of segment rows along the direction intersecting the feed direction at right angles, the rollers 31 in a number corresponding to the segments are provided. The roller 31 can measure the end faces of all the segments 2 in each row by providing the rollers 31 corresponding to the rows of segments 2 of the DPF 1. The roller 31 also contacts the bonding material 9, through which the segments 2 are bonded, to measure the amount of protrusion of the bonding material 9.

Figure 2:
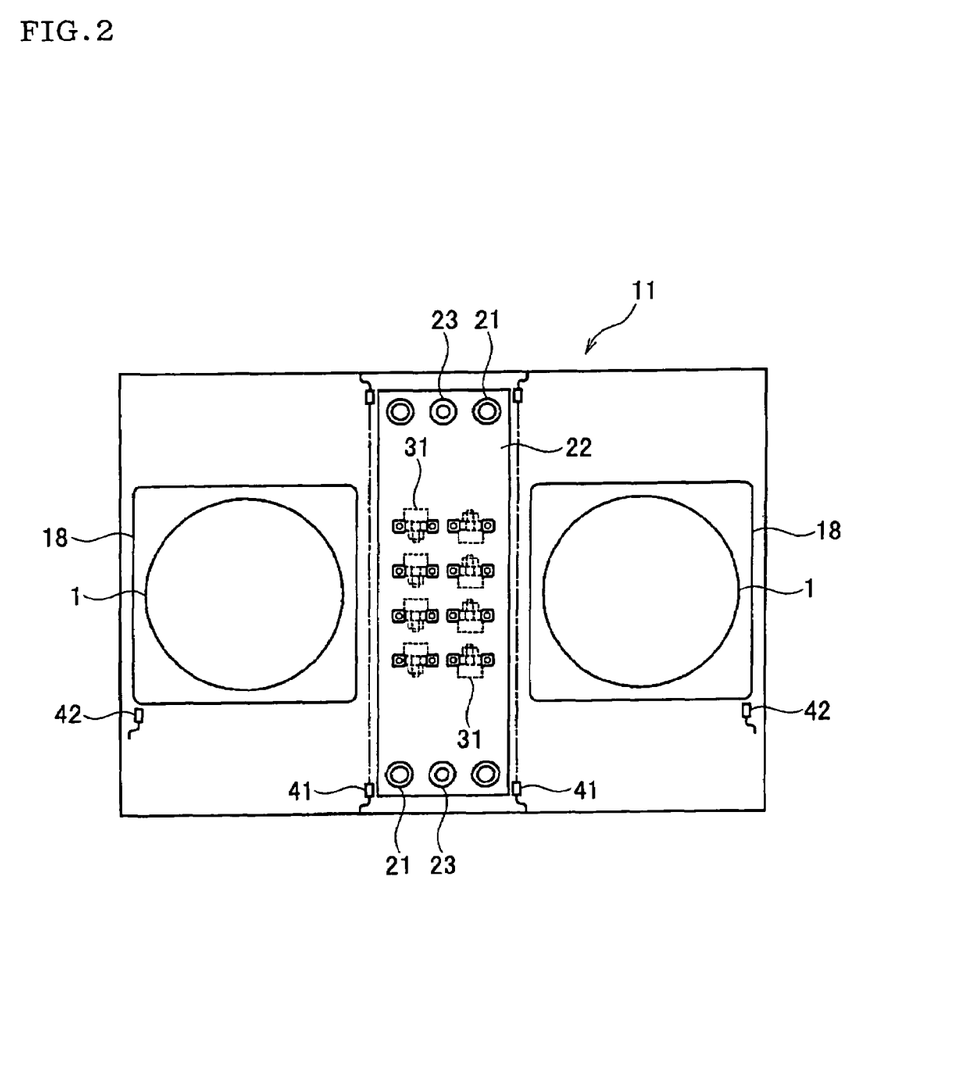
FIG. 2 is a plan view showing one embodiment of a shape-measuring device according to the present invention.
Figure 3:
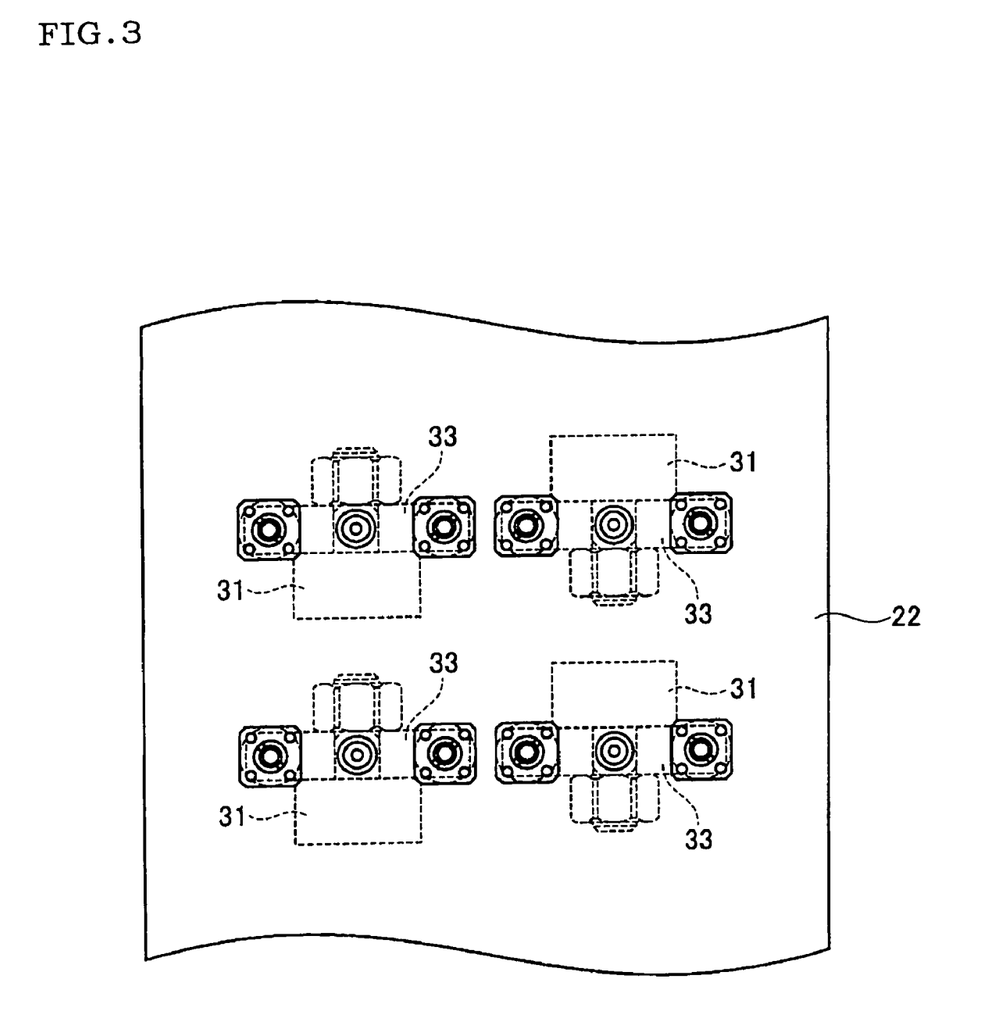
FIG. 3 is a plan view showing a roller arrangement portion.

In this embodiment, the rollers 31 are arranged in rows so that the adjacent rollers 31 are disposed in a staggered arrangement, as shown in FIGS. 2 and 3. Since such a staggered arrangement structure allows all the rollers 31 to be compactly disposed, the arrangement space can be reduced.

Figure 4:
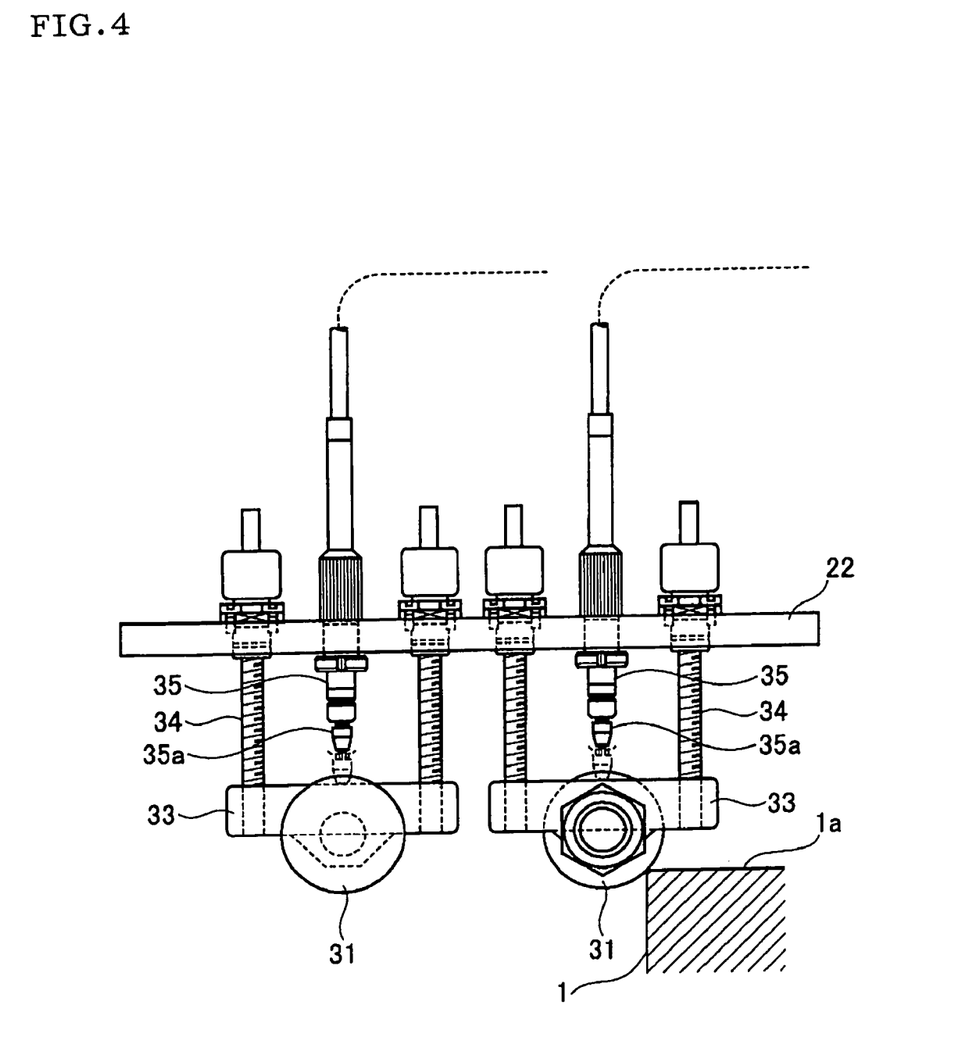
FIG. 4 is a front view showing the relationship among disposed rollers and a DPF.
Figure 5:
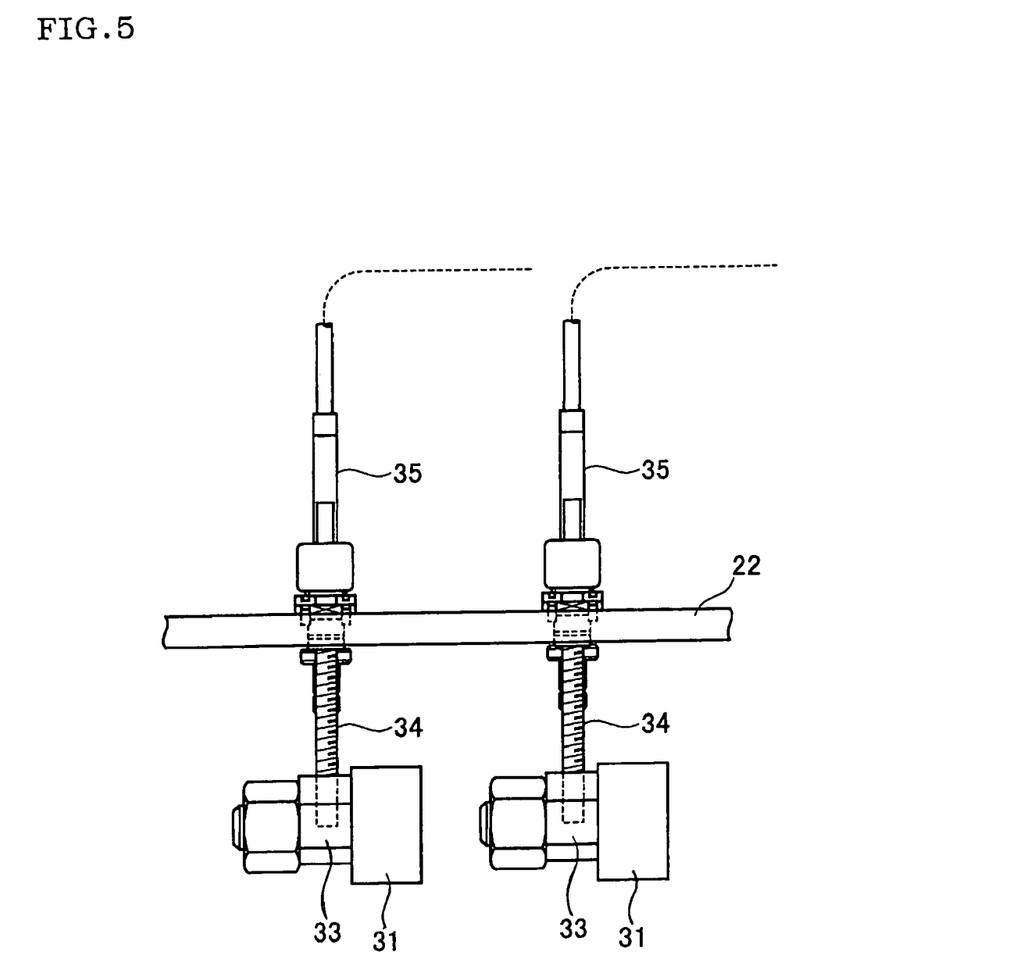
FIG. 5 is a side view showing a roller arrangement state.

As shown in FIGS. 4 and 5, the roller 31 is rotatably supported by an approximately horizontal roller frame 33. Therefore, when the DPF 1 moves so that the end face 1a contacts the roller 31, the roller 31 can rotate while contacting the end face 1a.

In this embodiment, a cam follower is used as the roller. The cam follower, which is a bearing in which a needle-shaped roller is provided inside an outer ring, exhibits a small rotational torque, whereby the outer ring can be suitably rotated upon contact with the end face 1a of the DPF 1. Therefore, the cam follower can reduce the amount of wear of the contact and can be displaced while advantageously following the unevenness of the end face 1a of the DPF 1, whereby a highly accurate measurement can be achieved.

The roller frame 33 is secured to a support rod 34 suspended from the measurement stage 22 so that the roller frame 33 can vertically move. When the roller 31 is displaced in the vertical direction, the roller frame 33 is displaced in the same direction in an amount equal to that of the roller 31. In such a structure, when the roller 31 rotates on the end face 1a of the DPF 1, the roller 31 is vertically displaced to follow the unevenness of the end face 1a. At the same time, the roller frame 33 is displaced in the same manner as the roller 31.

A contact probe 35 as detection means for detecting the amount of displacement of the roller 31 is disposed corresponding to the roller 31. As shown in FIG. 4, the contact probe 35 is suspended from the measurement stage 22 so that a detection head 35a contacts the top surface of the roller frame 33.

Therefore, the contact probe 35 measures the amount of displacement of the roller frame 33 when the roller frame 33 is vertically displaced. This allows the contact probe 35 to detect the amount of displacement of the roller 31 through the roller frame 33.

The amount of displacement of the roller detected by the contact probe 35 is output to calculation means 37 shown in FIG. 1. The calculation means 37 calculates shape data of the DPF 1 based on the amount of displacement. As the calculation means 37, a personal computer or the like is used. The calculation means 37 may calculate the shape data based on the top surface of the placement stage 18 of the movement section 12 on which the DPF 1 is placed.

As shown in FIG. 2, a workpiece detection sensor 41 and a stroke end sensor 42 are disposed in the movement section 12. The workpiece detection sensor 41 is disposed near the measurement section 13. The workpiece detection sensor 41 detects the side surface of the end of the DPF 1 which is placed on the placement stage 18 and is moved, and outputs a detection start signal of the DPF 1 which enters the measurement section 13.

FIG. 6 is a characteristic diagram in which the amount of displacement of the roller 31 is plotted corresponding to the moving distance relative to the DPF 1, which is obtained by allowing the roller 31 to rotate on the end face 1a of the DPF 1. T1 indicates the minimum value of the height of the DPF 1, T2 indicates the maximum value of the height of the DPF 1, and F indicates the width of the amount of displacement after slope correction.

The degree of parallelism of the end face 1a of the DPF 1 is calculated from the differences (T2−T1) obtained using all the rollers 31.

The degree of flatness of the end face 1a of the DPF 1 is calculated from the widths F of the amount of displacement obtained using all the rollers 31.

According to this embodiment, since the rollers 31 are provided corresponding to the rows of segments 2 of the DPF 1 and the rollers 31 measure the shape while being rotated to follow the segment rows, the required shape of the DPF 1 such as the degree of flatness and the degree of parallelism can be measured, and the measurement can be performed promptly and accurately.

Moreover, since protrusion of the bonding material 9 can be measured in addition to the segment row, accurate shape data can be obtained.

Since the shape is measured while moving the DPF 1, a continuous measurement can be performed, whereby a large number of objects can be processed.

The present invention is not limited to the above-described embodiment. Various modifications and variations may be made. For example, the roller 31 may be moved in one direction instead of moving the DPF 1 in one direction. Or, both of the DPF 1 and the roller 31 may be moved. An optical detection setup or a magnetic detection setup may be used as the detection means which detects the amount of displacement of the roller 31. A DPF 1 in the shape of an elliptical cylinder, polygonal cylinder, or the like may be used as the object. It suffices that the object be a structure in which segments are bonded in rows. The present invention may also be applied to a workpiece other than the DPF.

INDUSTRIAL APPLICABILITY

The shape-measuring device according to the present invention is useful as means for measuring the shape of an arbitrary object in which segments are arranged and bonded in rows. In particular, the shape-measuring device according to the present invention is suitably used when the object is a diesel particulate filter.

The invention claimed is:

1. A shape-measuring device which measures a shape of a object to be measured in which segments are arranged and bonded in rows while relatively moving the object in one direction, the shape-measuring device comprising:

a plurality of rollers provided corresponding to the rows of segments and displaced to follow unevenness of an end face of the object while being rotated on the end face due to the relative movement;

detection means provided corresponding to each of the rollers and detecting an amount of displacement of each of the rollers; and calculation means for calculating shape data of the object based on the amount of displacement of the roller detected by the detection means.

2. The shape-measuring device according to claim 1, wherein the detection means is a contact probe which contacts a roller frame on which the roller is rotatably secured and detects an amount of displacement of the roller frame resulting from the displacement of the roller.

3. The shape-measuring device according to claim 1, wherein the roller is a cam follower.

* * * * *